United States Patent [19]

Yamaguchi et al.

[11] Patent Number: 5,177,711
[45] Date of Patent: Jan. 5, 1993

[54] OJBECT DETECTING SWITCH DEVICE

[75] Inventors: Yukio Yamaguchi, Nagaokakyo; Atsushi Kawano, Nagoya; Hideyuki Suzaki, Ohtsu; Hiroshi Shimamoto, Yokohama, all of Japan

[73] Assignee: Omron Tateisi Electronics (now Omron Corporaton), Kyoto, Japan

[21] Appl. No.: 685,801

[22] Filed: Apr. 16, 1991

Related U.S. Application Data

[63] Continuation-in-part of Ser. No. 465,603, Jan. 18, 1990, Pat. No. 5,008,862, which is a continuation of Ser. No. 92,358, Sep. 2, 1987, abandoned.

[30] Foreign Application Priority Data

Sep. 2, 1986 [JP] Japan .................... 61-207455

[51] Int. Cl.⁵ ............................................ G01S 15/08
[52] U.S. Cl. .................................... 367/105; 367/99; 367/135; 367/901; 367/903
[58] Field of Search .................... 367/87, 99, 100, 105, 367/135, 901, 903

[56] References Cited

U.S. PATENT DOCUMENTS

| | | | |
|---|---|---|---|
| 4,169,255 | 9/1979 | Hulsman et al. | 367/100 |
| 4,561,064 | 12/1985 | Brüggen et al. | 367/99 X |
| 4,606,015 | 8/1986 | Yamaguchi | 367/99 X |
| 4,785,429 | 11/1988 | Folwell et al. | 367/99 X |
| 5,008,862 | 4/1991 | Shimamoto et al. | 367/105 |

Primary Examiner—Tod R. Swann
Attorney, Agent, or Firm—Fish & Richardson

[57] ABSTRACT

This switch device for detecting an object comprises a transducer for emitting and receiving ultrasonic signals to and from an object, a transmitter for driving the transducer, a receiver for receiving a signal from the transducer, a gate for detecting a short-distant object, a gate for detecting a long-distant object, and a circuit for setting the timings of the gates in accordance with the detecting ranges of the object.

Another switch device is disclosed for detecting an object which comprises a transducer for emitting and receiving ultrasonic signals to and from an object, a transmitter for driving the transducer, a receiver for receiving a signal from the transducer, a suppression gate for preventing detection of a reflected ultrasonic pulse during the transducer residual vibration period, a detectable distance gate for determining the range of detectable distances, an amplitude comparator for preventing detection of reflected ultrasonic pulses having an amplitude below a threshold value, and a plurality of window pulses for enabling detection of a reflected ultrasonic pulses at various distances.

13 Claims, 8 Drawing Sheets

OJBECT DETECTING SWITCH DEVICE

This application is a continuation-in-part of Ser. No. 07/465,603, filed Jan. 18, 1990, now U.S. Pat. No. 5,008,862, which is a continuation of Ser. No. 07/092,358, filed Sep. 2, 1987, now abandoned.

BACKGROUND OF THE INVENTION

This invention relates to an object detecting switch device. More particularly, the invention relates to an object detecting switch device which makes use of a common transducer for transmission and reception of ultrasonic signals.

Conventionally, an ultrasonic switch device transmits and receives ultrasonic signals to and from an object to be detected. However, this kind of ultrasonic switch produces echoes which prevents the switch from detecting the object unless the object is located close enough to reflect the ultrasonic signals within the range of the echoes.

In order to detect a short-distant object having reflective ultrasonic signals within the range of the echoes, the distance of the object is calculated by measuring a time period between first and second receiving signals. In another manner, a detection signal is produced if a signal is received during the opening period of a gate.

As illustrated in FIGS. 5(A) and 5(B), immediately after an echo E, it is impossible to determine whether or not a receiving signal is a first receiving signal unless a second receiving signal arrives. In FIG. 5(A), an object is shown to be in a location of 12 cm., while in FIG. 5(B) the object is shown at a distance of 6 cm. away, which is understood by referring to the second and third receiving signals (b2 and b3), respectively.

For this purpose, however, a detecting gate needs to be kept open for a period corresponding to 40 cm. if a detecting switch is intended for detecting an object located at a distance of 20 cm. Thus, constant reference to the first and second signals takes time in terms of object detection, and further has the disadvantage of easily picking up noises.

On the other hand, if reference is made only to the second receiving signal in the detection of an object, signals b1 and b2 cannot be distinguished between a detection range of 8 cm. or 16 cm., as shown in FIGS. 6(A) and 6(B). Thus, it is difficult to determine the range of detection displayed on a switch. Further, in FIG. 6(A), in a case wherein a detection gate is set up, for example, between a range of 10 to 15 cm., the detectable ranges are 10 to 15 cm. and 5.0 to 7.5 cm., which results in an undetectable range of 7.5 to 10.0 cm. Consequently, a non-continuous range is detected.

SUMMARY OF THE INVENTION

In order to solve the above-described problems, it is a primary object of this invention to provide an object detecting switch device which can detect an object located at a short distance, as well as at a long distance.

It is another object of this invention to provide an object detecting switch device which avoids picking up noises by shortening the opening time of a detection gate.

It is still another object of this invention to provide an object detecting switch device which can continuously vary its detecting range.

In accordance with one embodiment of this invention, there is provided an object detecting switch device which comprises a transducer for emitting and receiving ultrasonic signals to and from an object, a transmitter for driving the transducer, a receiver for receiving a signal from the transducer, a gate for detecting a short-distant object, a gate for detecting a long-distant object, and a circuit for setting the timings of the gates in accordance with the detecting ranges of the object.

In accordance with another embodiment of this invention, there is provided an object detecting switch device which comprises a transducer for emitting and receiving ultrasonic signals to and from an object, a transmitter for driving the transducer, a receiver for receiving a signal from the transducer, a suppression gate for preventing detection of a reflected ultrasonic pulse during the transducer residual vibration period, a detectable distance gate for determining the range of detectable distances, an amplitude comparator for preventing detection of reflected ultrasonic pulses having an amplitude below a threshold value, and a plurality of window pulses for enabling detection of a reflected ultrasonic pulses at various distances.

The foregoing and other objects, features and advantages of this invention will be apparent from the following, more particular, description of the preferred embodiments of this invention, as illustrated in the accompanying drawings.

DETAILED DESCRIPTION OF THE PREFERRED EMBODIMENTS

Figure 1:
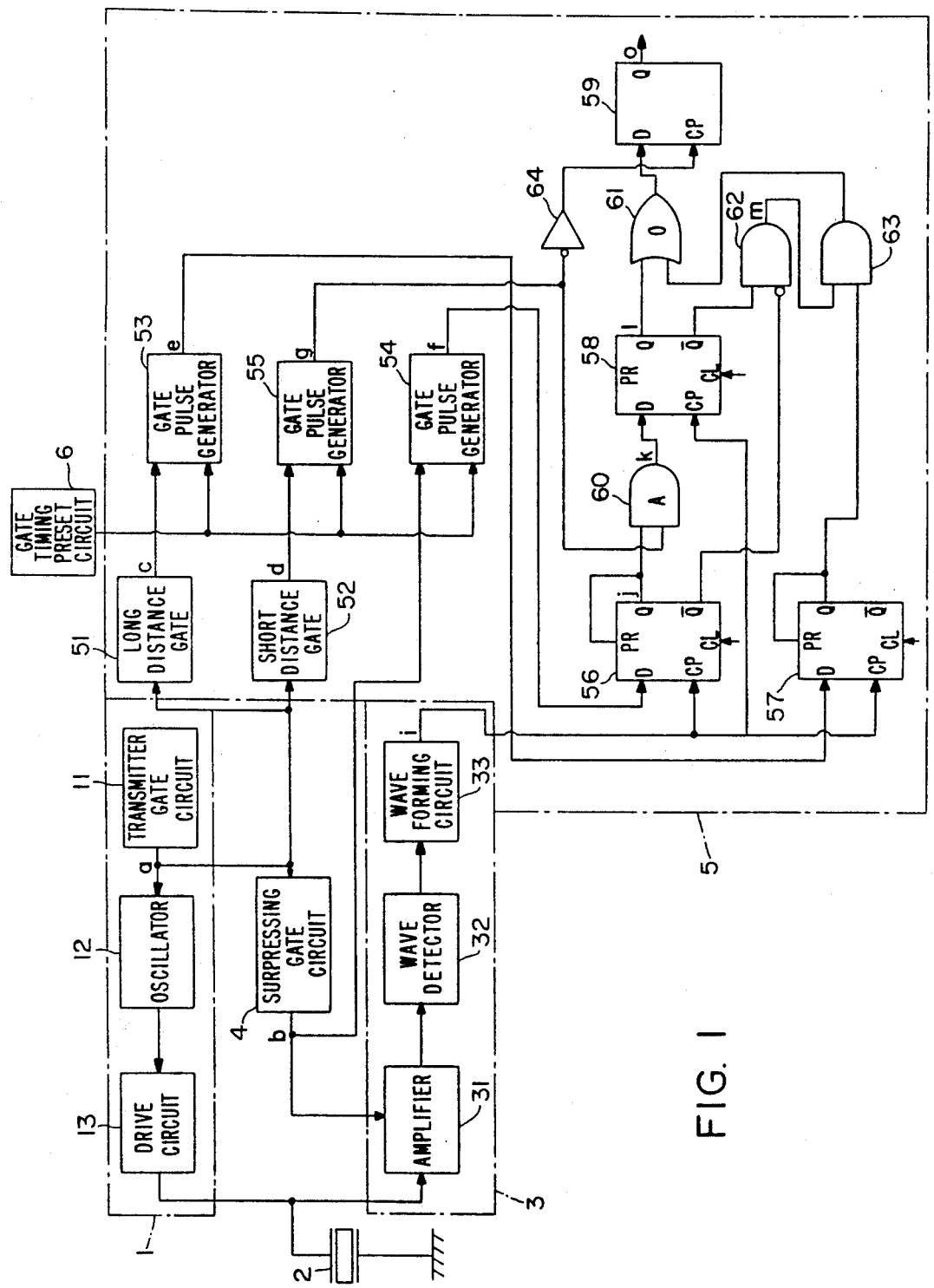
FIG. 1 is a circuit diagram representing an embodiment of an object detecting switch device in accordance with this invention.

FIG. 1 is an embodiment of this invention which comprises a transmitter 1, an ultrasonic transducer 2 driven by the transmitter 1, a receiver 3 for receiving a reflected signal, a suppressing gate 4 for suppressing an output of receiver 3 during a period corresponding to an echo, a signal processing circuit 5 for processing an output of receiver 3 to produce a detection signal, and a preset circuit 6 for presetting the timings of gates contained within the signal processing circuit 5 in accordance with a detecting range.

The transmitter 1 comprises a transmitting gate circuit 11, an oscillator 12 which is operable during an open period of the transmitting gate circuit 11, and a drive circuit 13 for driving the transducer 2 by the oscillator 12.

The receiver 3 comprises an amplifier 31 for amplifying an oscillating signal of the transducer 2, a wave detector 32, and a wave forming circuit 33 for forming an output pulse of the wave detector 32.

The suppressing gate circuit 4 provides the amplifier 31 with a suppressing signal "b" during a period corresponding to an echo from a gate signal "a" provided by the transmitting gate circuit 11.

Figure 2:
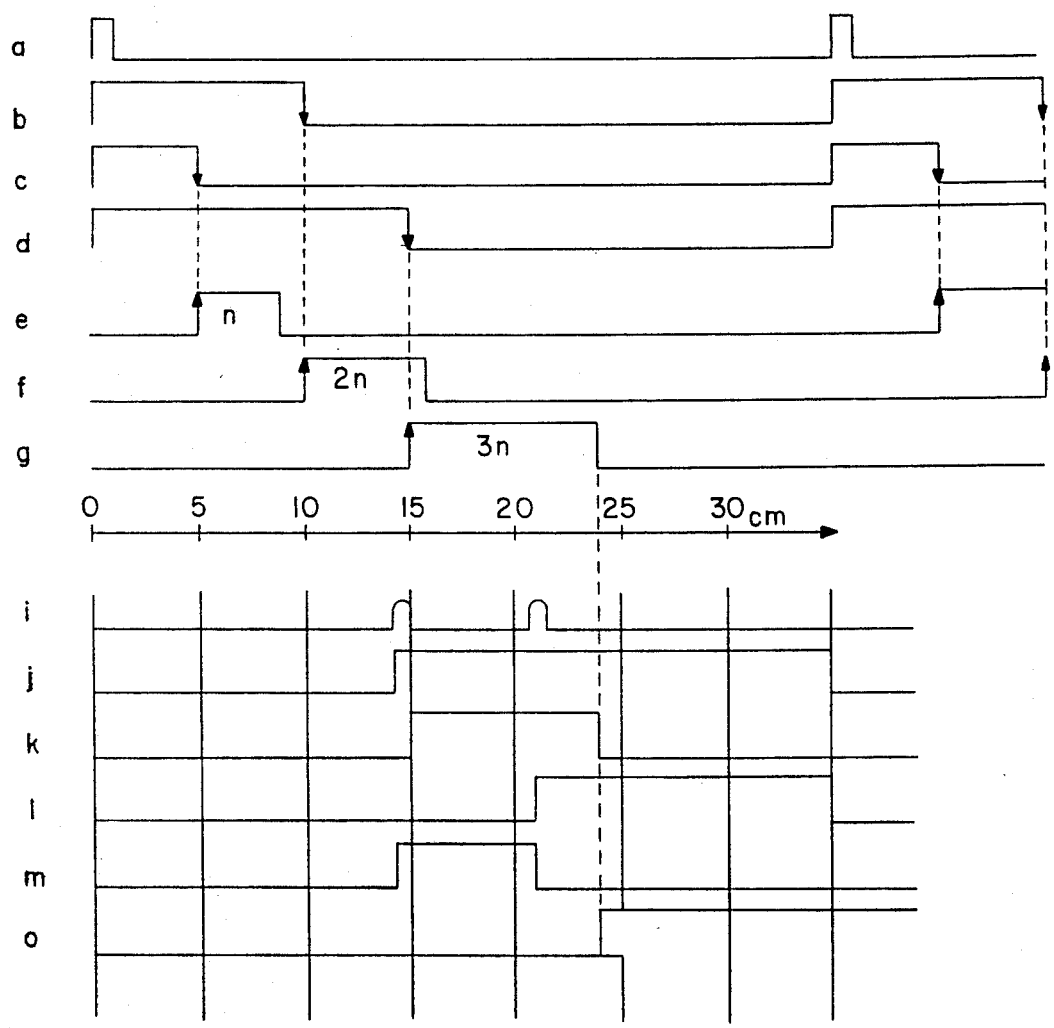
FIG. 2 is a time chart of a wave form under a detecting range of 8 cm. when using the instant invention as shown in FIG. 1.

The signal processing circuit 5 has a short-distance gate 52 and a long-distance gate 51 which, in turn, can receive a gate signal "a" from the transmitting gate circuit 11. Both gates 51 and 52 provide gate signals "c" and "d", respectively, which rise with gate signal "a" and fall on 5 and 15 cm., respectively, as shown in FIG. 2. The gate signals "a", "b", "c", and "d" have respective fixed gate timing periods.

The outputs of long-distance gate 51 and short-distance gate 52 are respectively connected to gate pulse generators 53 and 55. The output signal of suppressing gate circuit 4 is also applied to a gate pulse generator 54. The gate pulse generators 53, 54, and 55 have preset signals applied from the gate timing preset circuit 6.

The gate pulse generator 53 provides a gate signal "e" which rises on a falling edge of signal "c" and falls on a detecting range, designated as "n" (see FIG. 2), which is preset by preset circuit 6. The gate pulse generator 54 provides a gate signal "f" which rises on a falling edge of signal "b" and falls on a detecting range, designated as "2n". The pulse generator 55 provides a gate signal "g" which rises on a falling edge of signal "d" and falls on a detecting range, designated as "3n".

Thus, gate signals "e", "f", and "g" rise on 5 cm., 10 cm., and 15 cm., respectively, while falling on detecting ranges designated as "n", "2n", and "3n", respectively (wherein "n" is less than 10 cm.), which are variable according to detecting ranges.

The output of wave forming circuit 33 is connected to cp terminals of flip-flop circuits 56, 57 and 58. The outputs of gate pulse generators 53 and 54 are connected to D terminals of flip-flop circuits 57 and 56, respectively. The output of gate pulse generator 55 is connected to an AND gate 60 and a cp terminal of a flip-flop circuit 59 through an inverter 64. An output Q of flip-flop circuit 56 is connected to the AND gate 60 having its output in turn connected to a D terminal of flip-flop circuit 58. An output Q of flip-flop circuit 58 is connected to a D terminal of flip-flop circuit 59 through an OR gate 61 and its output Q' is connected to one input of prohibit gate 62. The other input of prohibit gate 62 is connected from output Q' of flip-flop circuit 56. The output of prohibit gate 62 is connected to an AND gate 63. Another input of the AND gate 63 is provided from an output Q of flip-flop circuit 57. The output of the AND gate 63 is in turn connected to the D terminal of flip-flop circuit 59 through the OR gate 61.

The operation of an embodiment of the object detecting switch device of the instant invention is hereinafter described. The following examples of detecting ranges at 8 cm., 15 cm. and 20 cm. are described for illustrating the operation of the above-discussed embodiment of the object detecting switch device:

1. PRESET DETECTING RANGE OF 8 CM

Gate signals "a", "b", "c" and "d" are fixed as shown in FIG. 2. Gate signals "e", "f" and "g" are preset by preset circuit 6 to have opening periods of 5 to 8 cm., 10 to 16 cm., and 15 to 24 cm., respectively.

Assuming that the distance of an object to be detected is 7 cm., wherein the first reflective signal is obtained within a period of gate signal "e", the gate signal "e" is suppressed by suppress signal "b" so that wave forming circuit 33 does not receive any pulse signals and output Q of flip-flop circuit 57 stays low. The second reflective signal returns at the point of 14 cm., designated as "i" in FIG. 2, whereby gate signal "f" is high so that flip-flop circuit 56 is set to make its output Q high, designated as "j" in FIG. 2. The AND gate 60 provides an output "k" at the distance of 15 cm., wherein gate signal "g" becomes high. The output "k" remains high up to the point of 24 cm., wherein gate signal "g" goes down.

The third reflective signal, designated as "i", comes at a distance of 21 cm. Here, the flip-flop circuit 58 is set to make its output "1" at a high level based on the output of the AND gate 60. The output "m" of prohibit gate 62 remains high after the setting of flip-flop circuit 56 and until the setting of flip-flop circuit 58 in which case the signal "1" goes up (see FIG. 2). However, the output signal "m" is low at the point of 24 cm., wherein gate signal "g" goes down. When gate signal "g" goes down, cp terminal of flip-flop circuit 59 is set at a high level through inverter 64, so that flip-flop circuit 59 is set to provide a detection signal "o", as shown in FIG. 2.

2. PRESET DETECTING RANGE OF 15 CM

Figure 3:
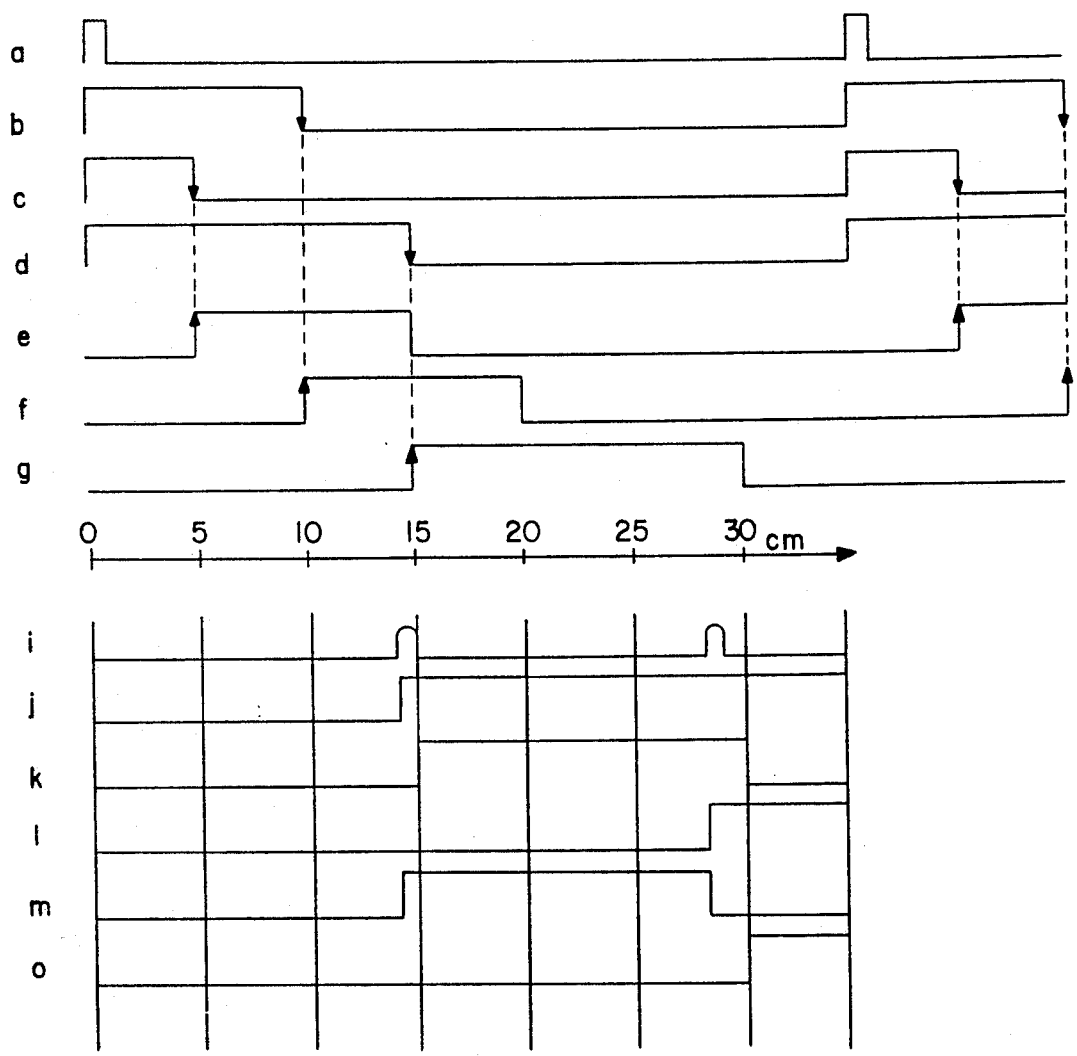
FIG. 3 is a time chart of a wave form under a detecting range of 15 cm. when using the instant invention as shown in FIG. 1.

In this case, gate signals "e", "f" and "g" are preset to provide gate opening periods of 5 to 15 cm., 10 to 20 cm., and 15 to 30 cm., respectively. Assuming that the distance of an object to be detected is 14 cm., wherein the first reflective signal comes back at a point wherein gate signals "e" and "f" are high and the suppressing gate signal "b" is low, receiving signal "i" is applied from wave forming circuit 33 to the cp terminals of the flip-flop circuits 56 and 57. Thus, flip-flop circuits 56 and 57 are set to their outputs Q at a high level. Further, the AND gate 60 provides output "k" when gate signal "g" becomes high at the point of 15 cm. The output "k" remains high up to 30 cm., wherein gate signal "g" goes down. As illustrated in FIG. 3, the second reflective signal "i" comes in at the point of 28 cm., wherein flip-flop circuit 58 is set to provide a signal "1". At the distance of 30 cm. wherein gate signal "g" goes down, the signal "1" is inputted into flip-flop circuit 59 through the OR gate 61, in order to produce a detecting signal "o".

3. PRESET DETECTING RANGE OF 20 CM

In this case, presetting of gate timings using preset circuit 6 is performed so that gate signals "e", "f", and "g" have opening periods of 5 to 20 cm., 10 to 20 cm., and 15 to 30 cm., respectively.

Figure 4:
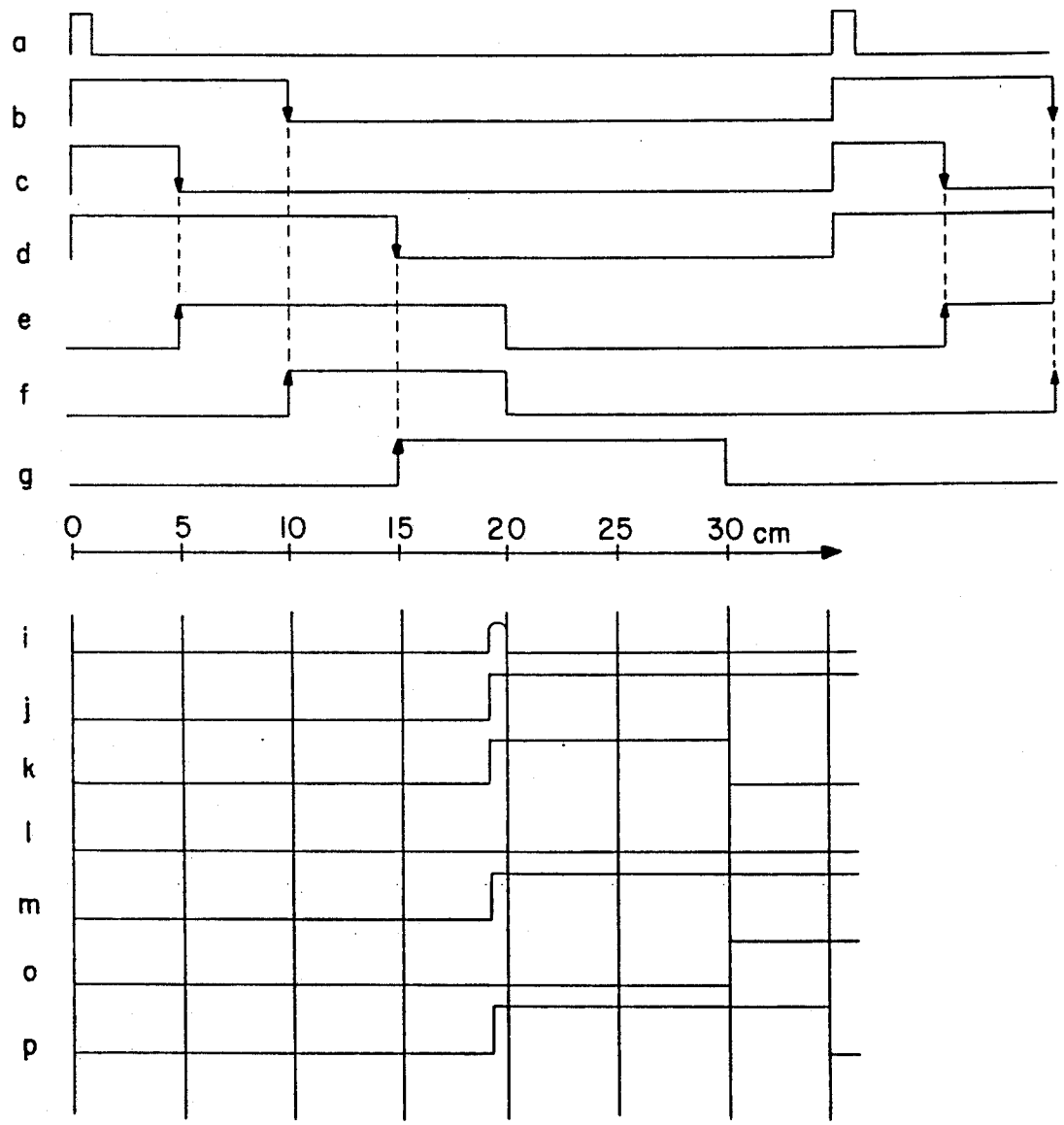
FIG. 4 is a time chart of a wave form under a detecting range of 20 cm. when using the instant invention as shown in FIG. 1.
Figure 5A:
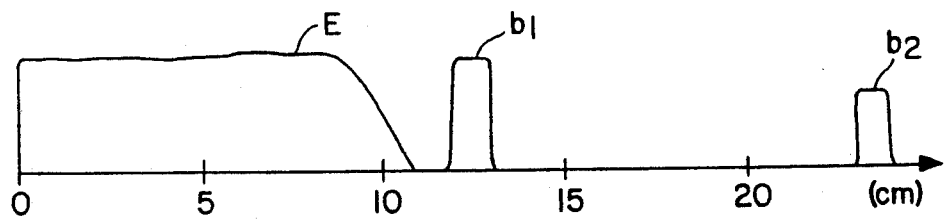
FIGS. 5(A) and 5(B) are time charts for use in describing a problem inherent in a conventional detecting switch device.
Figure 5B:
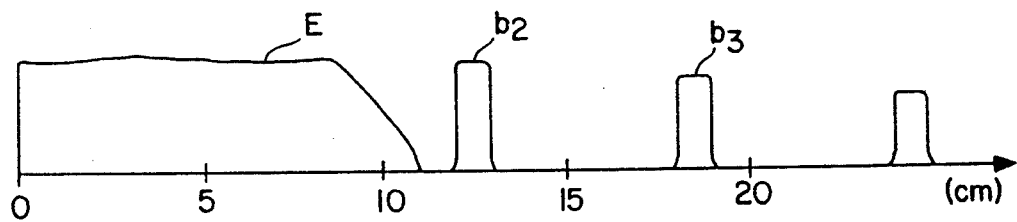
Figure 6A:
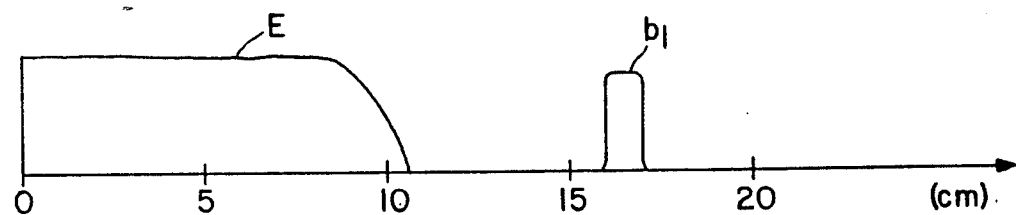
FIGS. 6(A) and 6(B) are time charts for use in describing another problem inherent in a conventional detecting switch device.
Figure 6B:
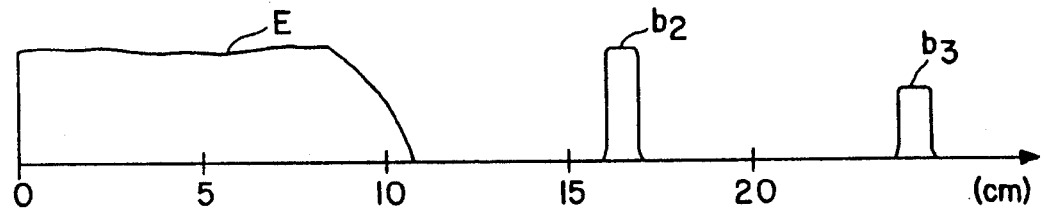

Here, it is assumed that the distance of an object to be detected is 19 cm., wherein the first reflective signal comes in when gate signals "e", "f" and "g" are all high and suppressing signal "b" is low, as illustrated in FIG. 4. Consequently, a reflective signal "i" is provided from wave forming circuit 33 and inputted to the cp terminals of flip-flop circuits 56 and 57, which in turn sets flip-flop circuits 56 and 57 to produce output signals "j" and "p".

The AND gate 60 produces output "k" at a distance of 19 cm. which remains at a high level up to 30 cm., wherein gate signal "g" goes down. However, another reflective signal is not received at the cp terminal of flip-flop circuit 58 which consequently keeps the output Q of flip-flop circuit 58, designated as "1" shown in FIG. 4, at a low level.

On the other hand, when the output Q' of the flip-flop circuit 56 becomes low at the distance of 19 cm., wherein the first reflective signal comes in, the output "m" of the prohibit gate 62 becomes high resulting in the high-state of the AND gate 63. The high signal from the AND gate 63 is applied to the D terminal of flip-flop circuit 59 through the OR gate 61, and thereafter inputted into flip-flop circuit 59 in order to produce a detection signal "o" at the point of 30 cm., wherein the gate signal "g" goes down.

ALTERNATIVE EMBODIMENT

Figure 7:
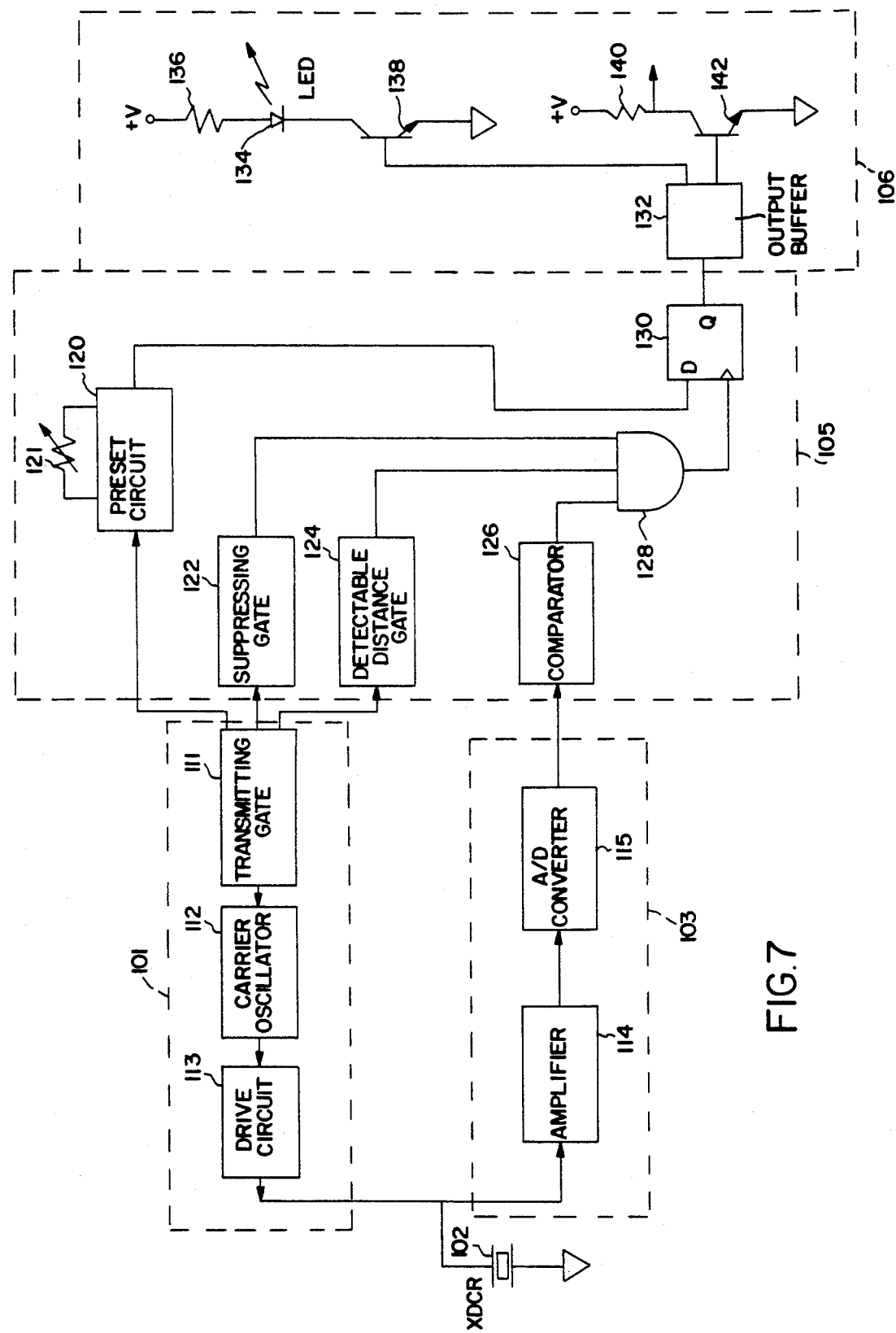
FIG. 7 is a circuit diagram representing another embodiment of an object detecting switch device in accordance with this invention.

FIG. 7 is an alternative embodiment of this invention which comprises a transmitter 101, an ultrasonic transducer 102 driven by the transmitter 101, a receiver 103 for receiving a reflected signal, a signal processing circuit 105 for processing an output of receiver 103 to produce a detection signal, and an output circuit 106 for processing the detection signal from the signal processing circuit 105.

The transmitter 101 comprises a transmitting gate circuit 111, a carrier oscillator 112 which is operable during an open period of the transmitting gate circuit 111, and a drive circuit 113 for driving the transducer 102 with the carrier signal output by the oscillator 112.

The receiver 103 comprises an amplifier 114 for amplifying an oscillating signal from the transducer 102, and an analog-to-digital (A/D) convertor 115 for digitizing the transducer signal amplified by amplifier 114 and providing a digital receiver output signal.

The signal processing circuit 105 includes a preset circuit 120, a suppressing gate circuit 122, a detectable distance gate circuit 124, a level comparator 126, a logical AND gate 128, and a data latch 130. Preset circuit 120, typically comprising a retriggerable oscillator having an output period determined by a variable resistor 121, suppressing gate 122, and detectable distance gate 124 are all triggered by transmitting gate 111 of transmitter 101. Level comparator 126 compares the output of A/D convertor 15 to a predetermined level. The output of level comparator 126 is combined with the outputs of suppressing gate 122 and detectable distance gate 124 by AND gate 128. The output of AND gate 128 drives the clock (>) input of data latch 130, and the output of preset circuit 120 drives the data (D) input of data latch 130.

The output circuit 106 includes an output buffer 132 for receiving the detected pulse output (Q) from data latch 30, and for driving an LED indicator circuit including an LED 134, a current limiting resistor 136 and a drive transistor 138. Output buffer 132 also drives a transistor driver circuit including pull-up resistor 140 and drive transistor 142.

Figure 8:
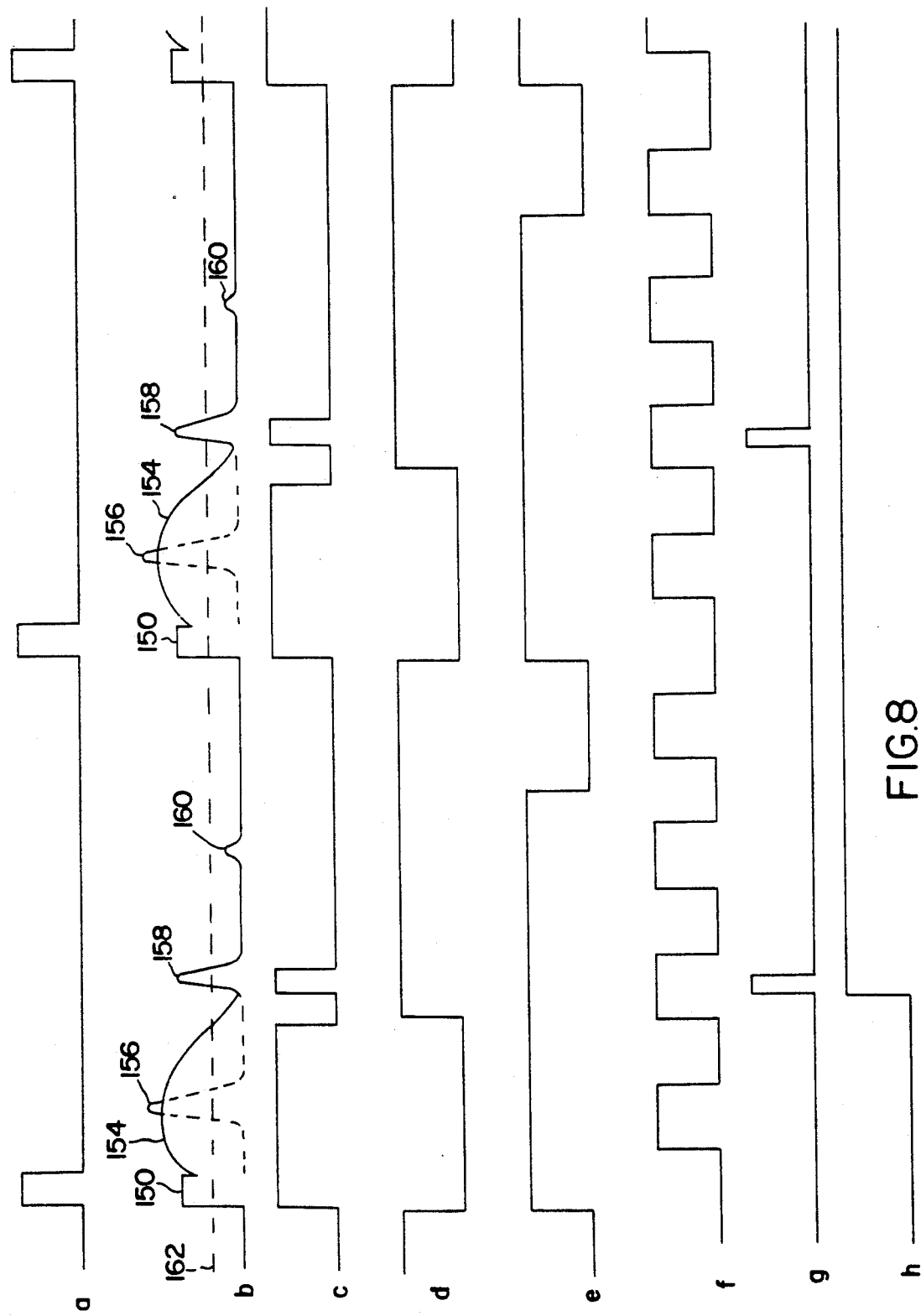
FIG. 8 is a time chart of waveforms for detecting a short range reflected ultrasonic pulse when using the instant invention as shown in FIG. 7.

Transmission gate circuit 111 periodically produces a gate pulse, shown by trace "a" of FIG. 8, which causes carrier oscillator 112 to produce a carrier for the duration of the gate pulse. The gated carrier output from carrier oscillator 112 feeds drive circuit 113 which drives transducer 112.

Amplifier 114 of receiver 103 produces the output signal, shown by trace "b" of FIG. 8, which includes the period 150 during which the transducer is driven, a period 154 of residual transducer vibration, and reflective pulse returns 156, 158, and 160. In the case shown in FIG. 8, i.e., the short range case, the first reflective pulse return 156 from the object occurs during the residual transducer vibration period 154, making it difficult or impossible for A/D convertor 115 to distinguish between the first reflective pulse return and the residual transducer vibration. However, the second and third reflective pulse returns from the object, 158 and 160, respectively, occur after the residual transducer vibration has dissipated, and are thus each distinguishable by A/D convertor 115.

Comparator 126 of signal processing circuit 105 compares the output from A/D convertor 115 with a preset threshold value, shown by broken line 162 superimposed over trace "b" of FIG. 8, and outputs a logic high to AND gate 128 when the signal of trace "b" is above threshold value 162. The corresponding output of comparator 126 is shown by trace "c" of FIG. 8. It should be noted that trace "c" is logic high for the pulse transmission period 150, most of the residual transducer vibration period 154, and for the second reflective pulse return 158. Trace "c" remains low, however, for the third reflective pulse return 160 since the amplitude of the third reflective pulse never exceeds the threshold value 162 of trace "b".

Trace "d" of FIG. 8 shows the output of suppressing gate circuit 122, which is triggered by the leading edge of the gate pulse from transmitting gate circuit 111, and produces a logic low at another input of AND gate 128 to prevent the output of AND gate 128 from triggering data latch 130 for a predetermined suppression period. The suppression period is slightly longer in duration than the residual transducer vibration period, and thus prevents unwanted triggering of the data latch by the residual transducer vibration signal.

Trace "e" of FIG. 8 shows the output of detectable distance gate 124, which is also triggered by the leading edge of the gate pulse from transmitting gate circuit 111. The output of detectable distance gate 124 produces a logic high at another input of AND gate 128, which enables the AND gate 128 to trigger data latch 130 for a predetermined detectable distance period. The detectable distance period thus determines the range of distances over which reflective pulse returns may be detected, i.e., the maximum range at which an object will be detected.

Trace "f" of FIG. 8 shows the output of preset circuit 120, which is triggered by the leading edge of the gate pulse from transmitting gate circuit 111, and produces a train of pulses defining window periods having a period adjusted by variable resistor 121. The logic high level of these pulses provide detection windows for particular detection distances relative to the transmitting gate pulse, adjustable by variable resistor 121.

Trace "g" of FIG. 8 shows the output of AND gate 128 which produces a logic high pulse when the output of comparator 126 (trace "c"), the output of suppressing gate 122 (trace "d"), and the output of detectable distance gate 124 (trace "e") simultaneously obtain a logic high state. The pulsed output of AND gate 128 drives the clock input of latch 130 to capture the state of the preset circuit driving the D input of the latch on the leading edge of the AND gate output. When the AND gate pulse of trace "g" corresponds with a preset circuit logic high level of trace "f", the Q output of latch 130 is driven to a logic high state, shown in trace "h", indicating that a reflective pulse return has been detected, in this case the second reflective pulse return 158 of trace "b".

Thus, to detect a reflective pulse return, the return must be received (1) after the predetermined suppression period corresponding to the residual transducer vibration, (2) within the detectable distance determined by the detectable distance gate, (3) within a detectable distance window determined by the preset circuit, and (4) have an amplitude greater than a predetermined threshold value.

Figure 9:
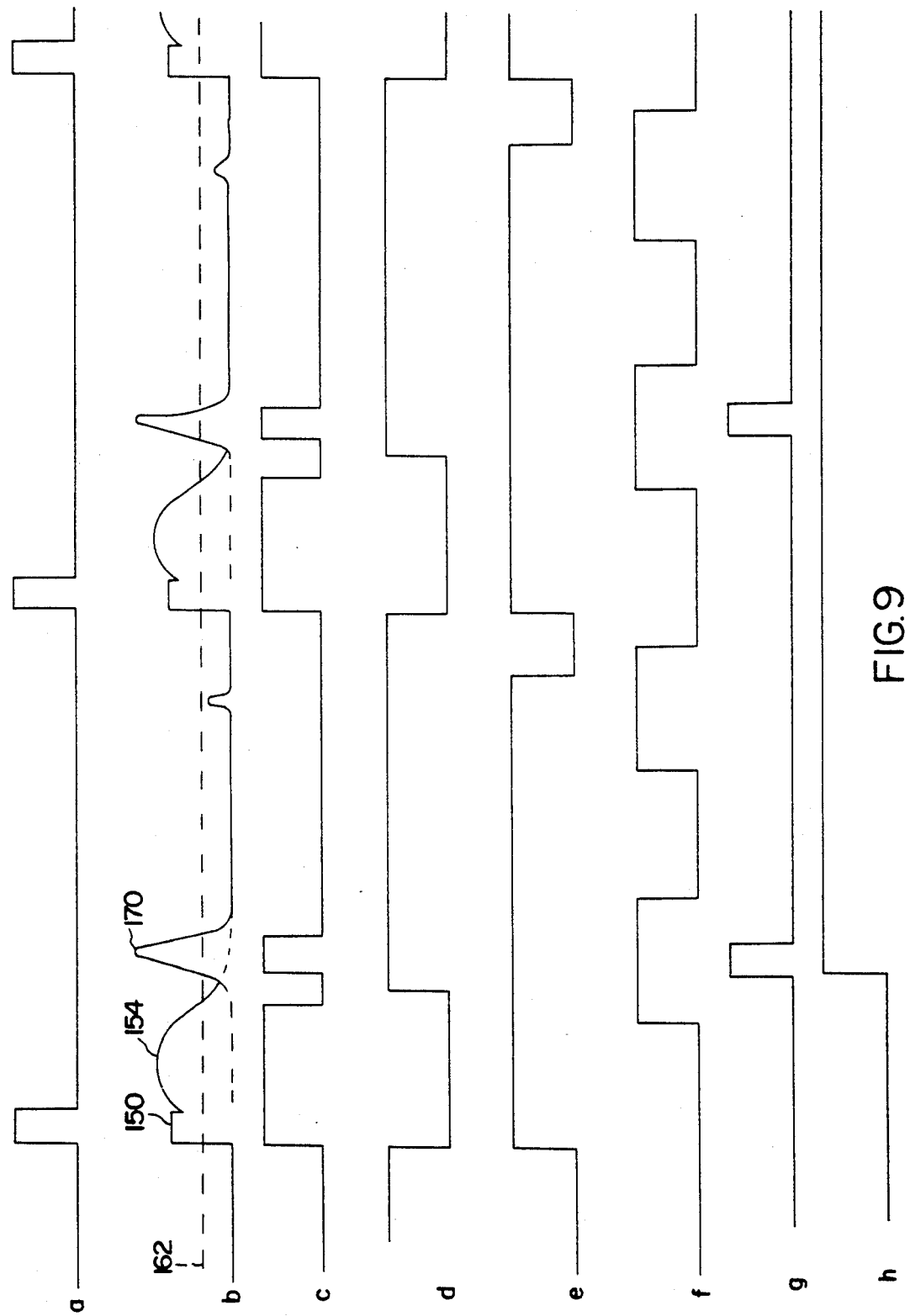
FIG. 9 is a time chart of waveforms for detecting a long range reflected ultrasonic pulse when using the instant invention as shown in FIG. 7.

FIG. 9 shows the traces "a" through "h", respectively corresponding to the traces of FIG. 8, for the long distance case. Specifically, FIG. 9 differs from FIG. 8 in that the first reflected ultrasonic pulse 170 occurs after the residual vibration period 154, rather than during the residual vibration period as in FIG. 8, which allows detection of the first reflected ultrasonic pulse in this case. Additionally, the detection of the first reflected ultrasonic pulse occurs during the first window pulse period output from preset circuit 120, rather than during the second window pulse period as in FIG. 8.

In the above-described structural arrangements and operations, in accordance with embodiments of this invention, it is possible to detect an object not only at a short distance away, but also at a long distance by continuously adjusting the detecting range. Moreover, multiple reflective signals are applied only for detecting a short-distance object, so that it is possible to generally keep reflective signals at high levels. Further, gate opening periods are shorter with the instant invention, thereby significantly reducing the noise being picked up.

While the invention has been particularly shown and described in reference to preferred embodiments thereof, it will be understood by those skilled in the art that changes in form and details may be made without departing from the spirit and scope of the invention.

We claim:

1. An object detecting device, comprising
   a transducer for emitting ultrasonic pulses to and receiving reflected ultrasonic pulses from an object;
   a driving means for driving said transducer with at least one original drive signal;
   a transmitting gate means for generating a transmitting gate pulse for controlling said original drive signal;
   a processor for processing a plurality of said reflected ultrasonic pulses from said transducer;
   distance determining means for determining the distance from said transducer to the object, comprising
   (1) a suppression gate generating means for generating a suppression gate for preventing detection of a said reflected ultrasonic pulse for a predetermined period of time after said original drive signal;
   (2) a detectable distance gate generating means for generating a detectable distance gate for enabling detection of a said reflected ultrasonic pulse for a predetermined period of time after said original drive signal;
   (3) an amplitude comparison means for comparing the amplitude of a said reflected ultrasonic pulse to a predetermined value, and preventing detection of a said reflected ultrasonic pulse having an amplitude below said predetermined value;
   (4) window pulse generating means for generating a plurality of window pulses for enabling detection of a said reflected ultrasonic pulse during a said window pulse; and
   (5) reflected pulse detection means for detecting a said reflected ultrasonic pulse utilizing said suppression gate, said detectable distance gate, said amplitude comparison means, and said window pulses;
   wherein said distance from said transducer to said object is determined by said detected reflected ultrasonic pulse.

2. The object detecting device of claim 1, wherein said window pulse generating means comprises pulse variation means for varying the period of said window pulses.

3. The object detecting device of claim 1, wherein said amplitude comparison means comprises an analog comparator.

4. The object detecting device of claim 1, wherein said processor comprises an analog to digital convertor for converting said reflected ultrasonic pulse to digital values.

5. The object detecting device of claim 4, wherein said amplitude comparison means comprises a digital comparator.

6. The object detecting device of claim 1, further comprising
   an output buffer stage coupled to said distance determining means for indicating said detected reflected ultrasonic pulse, wherein said output buffer stage includes a visual indicator for indicating a detected reflected ultrasonic pulse, and wherein said visual indicator includes an LED.

7. An object detecting device, comprising
   a transducer for emitting ultrasonic pulses to an receiving reflected ultrasonic pulses from an object;
   a driving means for driving said transducer with at least one original drive signal;
   a transmitting gate means for generating a transmitting gate pulse for controlling said original drive signal;
   a processor for processing a plurality of said reflected ultrasonic pulses from said transducer;
   distance determining means for determining the distance from said transducer to the object, comprising
   (1) a suppression gate generating means for generating a suppression gate for preventing detection of a said reflected ultrasonic pulse for a predetermined period of time after said original drive signal;
   (2) a detectable distance gate generating means for generating a detectable distance gate for enabling detection of said reflected ultrasonic pulse for a predetermined period of time after said original drive signal;
   (3) an amplitude comparison means for comparing the amplitude of a said reflected ultrasonic pulse to a predetermined value, and preventing detection of said reflected ultrasonic pulse having an amplitude below said predetermined value;
   (4) window pulse generating means for generating a plurality of window pulses for enabling detection of a said reflected ultrasonic pulse during a said window pulse; and (5) reflected pulse detection means for detecting a said reflected ultrasonic pulse utilizing said suppression gate, said detectable distance gate, said amplitude comparison means, and said window pulses;

wherein said distance from said transducer to said object is determined by said detected reflected ultrasonic pulse;

wherein said window pulse generating means comprises pulse variation means for varying the period of said window pulses; and wherein said window pulse generating means comprises a retriggerable oscillator.

8. The object detecting device of claim 7, wherein said pulse variation means comprises a variable resistor for adjusting the period of oscillation of said retriggerable oscillator.

9. The object detecting device of claim 7, wherein said retriggerable oscillator is triggered by said transmitting gate pulse.

10. An object detecting device, comprising
a transducer for emitting ultrasonic pulses to an receiving reflected ultrasonic pulses from an object;
a driving means for driving said transducer with at least one original drive signal;
a transmitting gate means for generating a transmitting gate pulse for controlling said original drive signal;
a processor for processing a plurality of said reflected ultrasonic pulses from said transducer;
distance determining means for determining the distance from said transducer to the object, comprising
(1) a suppression gate generating means for generating a suppression gate for preventing detection of a said reflected ultrasonic pulse for a predetermined period of time after said original drive signal;
(2) a detectable distance gate generating means for generating a detectable distance gate for enabling detection of said reflected ultrasonic pulse for a predetermined period of time after said original drive signal;
(3) an amplitude comparison means for comparing the amplitude of a said reflected ultrasonic pulse to a predetermined value, and preventing detection of a said reflected ultrasonic pulse having an amplitude below said predetermined value;
(4) window pulse generating means for generating a plurality of window pulses for enabling detection of a said reflected ultrasonic pulse during a said window pulse; and
(5) reflected pulse detection means for detecting a said reflected ultrasonic pulse utilizing said suppression gate, said detectable distance gate, said amplitude comparison means, and said window pulses;

wherein said distance from said transducer to said object is determined by said detected reflected ultrasonic pulse; and wherein said reflected pulse detection means comprises
a logical AND gate for performing a logical AND function on said suppression gate, said detectable distance gate, and the output of said amplitude comparator means, and
a data latch for latching the state of said window pulse dependent on the output stage of said AND gate, said output of said data latch being indicative of a said detected reflected ultrasonic pulse.

11. An object detecting device, comprising
a transducer for emitting ultrasonic pulses to an receiving reflected ultrasonic pulses from an object;
a driving means for driving said transducer with at least one original drive signal;
a transmitting gate means for generating a transmitting gate pulse for controlling said original drive signal;
a processor for processing a plurality of said reflected ultrasonic pulses from said transducer;
distance determining means for determining the distance from said transducer to the object, comprising
(1) a suppression gate generating means for generating a suppression gate for preventing detection of a said reflected ultrasonic pulse for a predetermined period of time after said original drive signal;
(2) a detectable distance gate generating means for generating a detectable distance gate for enabling detection of said reflected ultrasonic pulse for a predetermined period of time after said original drive signal;
(3) an amplitude comparison means for comparing the amplitude of a said reflected ultrasonic pulse to a predetermined value, and preventing detection of a said reflected ultrasonic pulse having an amplitude below said predetermined value;
(4) window pulse generating means for generating a plurality of window pulses for enabling detection of a said reflected ultrasonic pulse during a said window pulse; and
(5) reflected pulse detection means for detecting a said reflected ultrasonic pulse utilizing said suppression gate, said detectable distance gate, said amplitude comparison means, and said window pulses;

wherein said distance from said transducer to said object is determined by said detected reflected ultrasonic pulse; and wherein said detectable distance gate means and said suppression gate means are triggered by said transmitting gate pulse.

12. The object detecting device of claim 11 wherein said window pulse generating means comprises a retriggerable oscillator triggered by said transmitting gate pulse.

13. The object detecting device of claim 12 wherein said reflected pulse detection means comprises
a logical AND gate for performing a logical AND function on said suppression gate, said detectable distance gate, and the output of said amplitude comparator means, and
a data latch for latching the state of said window pulse dependent on the output state of said AND gate, said output of said data latch being indicative of a said detected reflected ultrasonic pulse.

* * * * *